United States Patent
Rizkalla

(10) Patent No.: US 6,846,774 B2
(45) Date of Patent: Jan. 25, 2005

(54) ETHYLENE OXIDE CATALYST

(75) Inventor: Nabil Rizkalla, Rivevale, NJ (US)

(73) Assignee: Scientific Design Co., Inc., Little Ferry, NJ (US)

( * ) Notice: Subject to any disclaimer, the term of this patent is extended or adjusted under 35 U.S.C. 154(b) by 79 days.

(21) Appl. No.: 10/421,468

(22) Filed: Apr. 23, 2003

(65) Prior Publication Data

US 2004/0214719 A1 Oct. 28, 2004

(51) Int. Cl.$^7$ .......................... B01J 23/48; B01J 23/50; B01J 20/00; B01J 21/04; B01J 23/00
(52) U.S. Cl. ..................... 502/348; 502/347; 502/355; 502/415; 502/439
(58) Field of Search ............................ 502/347, 348, 502/355, 415, 439

(56) References Cited

U.S. PATENT DOCUMENTS

| | | | |
|---|---|---|---|
| 3,563,913 A | 2/1971 | de Krijger et al. | |
| 3,563,914 A | 2/1971 | Wattimena | |
| 3,702,259 A | 11/1972 | Nielsen | |
| 3,962,136 A | 6/1976 | Nielsen et al. | |
| 4,007,135 A | 2/1977 | Hayden et al. | |
| 4,010,115 A | 3/1977 | Nielsen et al. | |
| 4,012,425 A | 3/1977 | Nielsen et al. | |
| 4,212,772 A | 7/1980 | Mross et al. | |
| 4,242,235 A | * 12/1980 | Cognion et al. | ............ 502/243 |
| 4,272,443 A | 6/1981 | Titzenthaler et al. | |
| 4,278,562 A | 7/1981 | Mross et al. | |
| 4,368,144 A | 1/1983 | Mitsuhata et al. | |
| 4,414,135 A | 11/1983 | Nojiri et al. | |
| 4,740,493 A | 4/1988 | Boehning et al. | |
| 4,766,105 A | 8/1988 | Lauritzen | |
| 4,908,343 A | 3/1990 | Bhasin | |
| 5,011,807 A | 4/1991 | Hayden et al. | |
| 5,057,481 A | 10/1991 | Bhasin | |
| 5,102,848 A | 4/1992 | Soo et al. | |
| 5,418,202 A | * 5/1995 | Evans et al. | ................. 502/348 |
| 5,486,628 A | 1/1996 | Kemp | |
| 5,504,052 A | 4/1996 | Rizkalla et al. | |
| 5,597,773 A | * 1/1997 | Evans et al. | ................. 502/348 |
| 5,646,087 A | * 7/1997 | Rizkalla et al. | ............. 502/347 |
| 5,663,385 A | * 9/1997 | Kemp | ......................... 549/536 |
| 5,705,661 A | 1/1998 | Iwakura et al. | |
| 5,929,259 A | * 7/1999 | Lockemeyer | ................ 549/534 |
| 6,103,916 A | 8/2000 | Takada et al. | |
| 6,750,173 B2 | * 6/2004 | Rizkalla et al. | ............. 502/348 |

FOREIGN PATENT DOCUMENTS

| | | |
|---|---|---|
| EP | 0247414 | 5/1987 |
| EP | 0266015 | 5/1988 |
| EP | 0716884 A2 | 6/1996 |
| WO | WO 00/15333 | 3/2000 |
| WO | WO 00/15334 | 3/2000 |
| WO | WO 00/15335 | 3/2000 |

* cited by examiner

*Primary Examiner*—Cam N. Nguyen
(74) *Attorney, Agent, or Firm*—William C. Long; Roberts & Roberts, LLP

(57) ABSTRACT

The invention relates to an ethylene oxide catalyst comprised of silver deposited on an alumina carrier which has been treated to with an aqueous basic salt solution, the pH of the aqueous treating solution is maintained above 8 during the treatment.

4 Claims, No Drawings

ETHYLENE OXIDE CATALYST

RELATED APPLICATION

This application is related to copending application Ser. No. 10/118,192, filed Apr. 8, 2002

BACKGROUND OF THE INVENTION

1. Field of the Invention

The present invention relates to silver catalysts for the oxidation of ethylene to ethylene oxide, and especially to the preparation of catalyst supports or carriers having improved properties such that catalysts comprising the carriers have enhanced utility.

2. Description of the Prior Art

Parent application Ser. No. 10/118,192 filed Apr. 8, 2002 provides a comprehensive description of the prior art. The disclosure of said Ser. No. 10/118,192 filed Apr. 8, 2002 is incorporated herein in its entirety.

In said co-pending case, procedures are described wherein at least 25% of the surface sodium is removed from the support and partially replaced with up to 10 ppm lithium in a pre-treatment procedure. Suitably, the support is pretreated with a basic salt solution, e.g. lithium carbonate.

BRIEF DESCRIPTION OF THE INVENTION

It has now been found that superior catalysts result where the pretreatment of the support is carried at a high pH during the entirety of the pretreatment. The pH should be higher than 8, and preferably higher than 9. Best results are achieved where the pH is maintained at a constant value in the range of about 10–13.0 during the pretreatment. A feature of the invention is the addition of base to the treating solution during the support pretreatment in order to maintain the desired high pH.

DETAILED DESCRIPTION

As above described, the present invention relates to an improvement in the general procedure which is described in copending application Ser. No. 10/118,192 filed Apr. 8, 2002, the disclosure of which is incorporated herein. In accordance with said procedure, at least 25% of the support surface sodium ions are removed and replaced with up to 10 ppm lithium ions. Now in accordance with the present invention, support pretreatment is carried out at a pH which is above 8, preferably above 9, and most preferably in the range of 10–13.0. In an especially preferred practice, during the support pretreatment the pH of the treating solution is maintained in the 10–13.0 range by continuous or intermittent addition of base to the solution.

According to the invention, during the pretreatment of a support such as alumina with the basic aqueous treating solution, e.g. a solution containing a lithium compound such as lithium chloride, carbonate, nitrate, formate, hydroxide and the like, the pH of the solution contacting the support is adjusted to a value which is higher than 8, preferably higher than 9 and most preferably in the range of 10–13.0. During the period of treatment where the support is contacted with the solution, additional base is added either periodically or on a continuous basis to maintain the solution pH in the desired range. Most preferably, the additional base is added at a rate sufficient to maintain the treating solution at a constant pH throughout the support treatment.

Preferred supports treated according to the invention are those containing principally alpha-alumina, particularly those containing up to about 15 wt % silica. Especially preferred supports have a porosity of about 0.1–1.0 cc/g and preferably about 0.2–0.7 cc/g. Preferred supports also have a relatively low surface area, i.e. about 0.2–2.0 m$^2$/g, preferably 0.4–1.6 m$^2$/g and most preferably 0.5–1.3 m$^2$/g as determined by the BET method. See J. Am. Chem. Soc. 60, 3098–16 (1938). Porosities are determined by the mercury porosimeter method; see Drake and Ritter, *Ind. Eng. Chem. Anal. Ed.,* 17, 787 (1945). Pore and pore diameter distributions are determined from the surface area and apparent porosity measurements.

For use in commercial ethylene oxide production applications, the supports are desirably formed into regularly shaped pellets, spheres, rings, etc. Desirably, the support particles may have an equivalent diameters in the range from 3–12 mm and preferably in the range of 4–10 mm, which are usually compatible with the internal diameter of the tubes in which the catalyst is placed. An Equivalent diameter is the diameter of a sphere having the same external surface (i.e. neglecting surface within the pores of the particle) to volume ratio as the support particles being employed.

Preferred catalysts which are prepared in accordance with this invention using the treated supports contain up to about 30% by weight of silver, expressed as metal, deposited upon the surface and throughout the pores of the porous refractory support. Silver contents higher than 20% by weight of total catalyst are effective, but result in catalysts which are unnecessarily expensive. Silver contents, expressed as metal, of about 5–20% based on weight of total catalyst are preferred, while silver contents of 8–15% are especially preferred.

In addition to silver, the catalyst prepared according to the invention also contains promoters, especially a critical amount of alkali metal promoter component. The amount of alkali metal promoter is not more than 3000 ppm expressed as alkali metal based on the catalyst weight; preferably the catalyst contains 400–1500 ppm, more preferably 500–1200 ppm alkali metal based on the catalyst weight. Preferably the alkali metal is cesium although lithium, potassium, rubidium and mixtures thereof can also be used.

Optionally also of practice of the invention is the provision of sulfur as a promoting catalyst component. The sulfur component can be added to the catalyst support impregnating solution as sulfate, e.g. Cesium sulfate, ammonium sulfate, and the like. U.S. Pat. No. 4,766,105 describes the use of sulfur promoting agents, for example at column 10, lines 53–60, and this disclosure is incorporated herein by reference. When used, the amount of sulfur (expressed as the element) in the amount of 5–300 ppm by weight, based on the weight of catalyst, is preferred.

The catalyst may also contain a fluorine promoter in the amount expressed as the element of 10–300 ppm by weight based on the weight of the catalyst. Ammonium fluoride, alkali metal fluoride, and the like can be used.

Preferably, the silver is added to the support by immersion of the support into a silver/amine impregnating solution or by the incipient wetness technique. The silver containing liquid penetrates by absorption, capillary action and/or vacuum into the pores of the support. A single impregnation or a series of impregnations, with or without intermediate drying, may be used, depending in part upon the concentration of the silver salt in the solution. To obtain catalyst having silver contents with the preferred range, suitable impregnating solutions will generally contain from 5–50 wt % silver, expressed as metal. The exact concentration employed will depend upon, among other factors, the desired silver content, the nature of the support, the viscosity of the liquid and the solubility of the silver compound.

Impregnation of the pretreated carrier is achieved in a conventional manner. The carrier is placed in the silver solution until all of the solution is absorbed by the support. Most preferably, the dry pretreated carrier is placed under vacuum and then the silver solution is introduced. The vacuum is removed only when all the carrier's pellets are coated with the solution, or when the liquid level is sufficient to cover the amount of carrier used. This ensures that all the pores of the carrier have been filled with the impregnating solution.

The impregnating solution, as already indicated, is characterized as a silver/amine solution, preferably such as is fully described in U.S. Pat. No. 3,702,259 the disclosure of which is incorporated herein by reference.

After impregnation, any excess impregnating solution is separated and the support, impregnated with silver and promoters, is calcined or activated. In most preferred practice of the invention, calcination is carried out as described in commonly assigned U.S. Pat. No. 5,504,052 granted Apr. 2, 1996 and co-pending application Ser. No. 08/587,281 filed Jan. 16, 1996, the disclosures of which are incorporated herein by reference. The calcination is accomplished by heating the impregnated support, preferably at a gradual rate, to a temperature in the range of 200–500° C. for a time sufficient to convert the contained silver salt to silver metal and to decompose the organic materials and remove the same as volatiles.

The impregnated support is optionally maintained under an inert atmosphere while it is above 300° C. and higher, oxygen is absorbed in substantial quantities into the bulk of the silver where it has an adverse effect on the catalyst characteristics. Inert atmosphere which are optionally employed in the invention are those which are essentially free of oxygen.

An alternative less desirable method of calcination is to heat the catalyst in a stream of air at a temperature not exceeding 300° C., preferably not exceeding 270° C.

Catalysts prepared in accordance with the invention have improved performance, especially stability, for the production of ethylene oxide by the vapor phase oxidation of ethylene with molecular oxygen. These usually involve reaction temperatures of about 150° C. to 400° C., usually about 200° C. to 300° C., and reaction pressures in the range from 0.5 to 35 bar. Reactant feed mixtures contain 0.5 to 20% ethylene and 3 to 15% oxygen, with the balance comprising comparatively inert materials including such substances as nitrogen, carbon dioxide, methane, ethane, argon and the like. Only a portion of the ethylene usually is reacted per pass over the catalyst and after separation of the desired ethylene oxide product and the removal of appropriate purge streams and carbon dioxide to prevent the uncontrolled build up of inert and/or by-products, unreacted materials are returned to the oxidation reactor.

The following examples illustrate the invention.

EXAMPLE-1 a. Preparation Of A Stock Solution Of Silver/Amine Complex:

A silver solution was prepared using the following components (parts are by weight):
Silver oxide-834 parts
Oxalic acid-442 parts
De-ionized water-1000 parts
Ethylenediamine-500 parts Silver oxide was mixed with water, at room temperature, followed by the gradual addition of the oxalic acid. The mixture was stirred for 15 minutes and at that point, the color of the black suspension of silver oxide had changed to the gray/brown color of silver oxalate. The mixture was filtered and the solids were washed with 3 liters of de-ionized water.

The sample was placed in an ice bath and stirred while ethylenediamine and water (as a 66%/34% mixture) were added slowly in order to maintain the reaction temperature lower than 33° C. After the addition of all the ethylenediamine/water mixture, the solution was filtered at room temperature. The clear filtrate was utilized as a silver/amine stock solution for the catalyst preparation.

b. Promoters Addition:

The clear stock solution was diluted with the 66/34 mixture of ethylenediamine/water. In addition, Cs hydroxide and ammonium hydrogen sulfate were added to the diluted silver solution in order to prepare a catalyst containing 11% silver, 40 ppm sulfur, and 800 ppm cesium.

c. Catalyst impregnation:

A 150 g sample of the carrier which had been pretreated as herein described was placed in a pressure vessel and then exposed to vacuum until the pressure was reduced to 50 mm Hg. 200 ml of the adjusted silver/promoters solution was introduced to the flask while it is still under vacuum. The pressure of the vessel was allowed to rise to atmospheric pressure and its contents were shaken for few minutes. The catalyst was separated from the solution and was now ready for calcination.

d. Catalyst Calcination:

Calcination, deposition of silver, was induced by heating the catalyst up to the decomposition temperature of the silver salt. This was achieved via heating in a furnace that has several heating zones in a controlled atmosphere. The catalyst was loaded on a moving belt that entered the furnace at ambient temperature. The temperature was gradually increased as the catalyst passed from one zone to the next. It was increased, up to 400° C., as the catalyst passed through seven heating zones. After the heating zones, the belt passed through a cooling zone that gradually cooled the catalyst to a temperature lower than 100° C. The total residence time in the furnace was 22 minutes.

C. Catalyst Testing:

The catalyst was tested in a stainless steel tube that was heated by a molten salt bath. A gas mixture containing 15% ethylene, 7% oxygen, and 78% inert, mainly nitrogen and carbon dioxide, was passed through the catalyst at 300 p.s.i.g. The temperature of the reaction was initially adjusted in order to obtain ethylene oxide productivity of 160 Kg per hour per $m^3$ of catalyst. After about one week of testing at this low work rate, the temperature of the reaction was raised to increase ethylene oxide productivity to 330 Kg per hour per $m^3$ of catalyst.

The carriers used were low sodium carriers made essentially of alpha-alumina and having the following specifications:

TABLE 1

| Carrier | Water absorption MI/gm | Surface analysis (ppm): (Acid-Leachable test) | |
|---|---|---|---|
| | | Sodium | Potassium |
| A | 31.1 | 81 | 11 |
| B | 31.6 | 57 | 49 |

TABLE 1-continued

| Carrier | Water absorption MI/gm | Surface analysis (ppm): (Acid-Leachable test) Sodium | Potassium |
|---|---|---|---|
| C | 30.4 | 89 | 5 |
| D | 33.4 | 46 | 12 |
| F | 33.6 | 78 | 14 |

EXAMPLE-2

Carrier A was treated with a 0.02 N lithium chloride solution in water at 65° C. at a pH=11:

Step 1. The pH of the treatment solution (0.02 N LiCl solution in water) was adjusted to the assigned value by the addition of the required amount of LiOH. 500 g sample of the carrier was placed in a pressure vessel and then exposed to vacuum until the pressure was reduced to 50 mm Hg. 1500 ml of the lithium chloride treatment solution was introduced to the flask while it is still under vacuum. When all the solution was added, the pressure of the vessel was allowed to rise to atmospheric pressure. The carrier and the liquid were then transferred to a jacketed addition funnel and the lithium solution was allowed to circulate through the carriers bed. The solution flowed constantly to the top of the funnel at a rate of about 5 L per hour. It was also drained, at the same rate, from the bottom of the funnel and the level of solution inside the funnel was maintained at about one inch above the level of the carrier. A hot liquid was allowed to circulate through the jacket to keep its temperature at 65° C. The treatment vessel was also provided with a burette containing a 0.1 N LiOH solution and with a pH meter. The detector of the pH meter was immersed in the top of the treatment funnel. Few drops of the LlOH solution were added as needed to keep the pH of the circulating solution at the assigned value, 11.0. The total amount of the 0.1 N LiOH solution that was added to keep the pH solution at this assigned value was 20 ml. At the end of this step, lasted 30 minutes, the solution was drained, weighed and saved for analysis.

Step 2. The treatment in step 1 was repeated, by adding 1500 ml of a fresh batch of the LiCl solution and the treatment continued for an additional 30 minutes. This step was repeated for a total of five cycles of Li treatment. The amounts of LlOH needed to maintain the targeted pH value in the different cycles are listed in the following table:

TABLE 1

| Cycle # | 1 | 2 | 3 | 4 | 5 |
|---|---|---|---|---|---|
| ML of 0.1N LiOH added | 20 | 10 | 10 | 10 | 10 |

Step 3. After the last cycle the carrier was washed with 1500 ml water at room temperature for 30 minutes. The pH of the water-washing step was not adjusted. The water washing was repeated once and was followed by draining the liquid and drying the carrier at 150° C. for 5 hours.

The following table summarizes the results of the Li treatment of the carrier:

TABLE 2

| Example | Solution used | pH | Temperature of treatment ° C. | Na removed, ppm |
|---|---|---|---|---|
| 1 C Comparative example | Carrier was not treated | | | |
| 2 | 0.02N LiCl | 11 | 65 | 67 |

The carrier was used for catalyst preparation and the catalyst was tested at the high work rate, 330, as was described in example 1. Also, an untreated carrier was used for catalyst preparation and was tested at the same work rate. Catalyst testing has demonstrated the improvement in stability of the catalyst that was made after the carrier treatment, table 3.

TABLE 3

| | Selectivity of the catalysts at work rate 330 | | | |
|---|---|---|---|---|
| Example | Selectivity at 200 hr | Selectivity at 300 hr | Selectivity at 400 hr | Selectivity at 500 hr |
| 1 C | 80.8 | 80.3 | 80 | 79.2 |
| 2 | 80.0 | 80.0 | 80.3 | 80.3 |

COMPARATIVE EXAMPLE B

This example was designed to illustrate the natural tendency of the surface of alpha-alumina to buffer the pH of the treating solution.

1000 g of carrier A was treated with 3000 ml of ammonium hydroxide solution in water at pH of 11. The details of the procedure were identical to example 2 step 1, with the exception that the pH of the solution was not adjusted during the carrier's treatment. The solution showed a consistent drop in its pH value as illustrated in table B.

TABLE B

| Time (hrs) | Start | 0.25 | 1 | 2 |
|---|---|---|---|---|
| PH | 11.04 | 10.18 | 9.81 | 9.64 |

EXAMPLES 3–7

Following the above procedure a series of support pre-treatments were carried out at different pH values as follows:

Step 1. The pH of the treatment solution (0.02 LiCl solution in water) was adjusted to the assigned values by the addition of the required amount of LiOH. 500 g samples of carrier A were treated using a procedure similar to that described in Example 2, with the exception of the pH value used in each case.

The following table summarizes the results of the Li treatment of carrier A.

TABLE 4

| Example | Solution | PH | Temperature of treatment ° C. | Na removed, ppm |
|---|---|---|---|---|
| 3 | 0.02N LiCl | 12 | 65 | 139 |
| 4 | 0.02N LiCl | 11 | 65 | 67 |
| 5 | 0.02N LiCl | 10.5 | 65 | 63 |

TABLE 4-continued

| Example | Solution | PH | Temperature of treatment ° C. | Na removed, ppm |
|---------|----------|-----|------------------------------|-----------------|
| 6 | 0.02N LiCl | 10 | 65 | 50 |
| 7 | 0.02N LiCl | 9.5 | 65 | 44 |

It is evident that the rate of Na removal is proportional to the pH of the treatment.

EXAMPLE 8

Example 2 was repeated at 65° C. using 0.02N CsCl solution at pH 11. The pH of the Cs solution was adjusted using 1.0N CsOH solution. The amount of removed Na was 80.4 ppm.

EXAMPLE 9

Example 2 was repeated at 65° C. using 0.02N KCl solution at pH 11. The pH of the Cs solution was adjusted using 1.0N KOH solution. The amount of removed Na was 78 ppm.

EXAMPLE 10

A sample of carrier B was washed in an identical procedure to the one used in example 2, using LiOH at pH 11. The amount of removed Na was 180 ppm.

EXAMPLE 11

A sample of carrier C was washed in an identical procedure to the one used in example 2, using LiOH at pH 11. The amount removed Na was 188 ppm.

EXAMPLE 12

Example 2 was repeated at 65° C. using 0.3N $NH_4OH$ solution at pH 11. The pH of the solution was adjusted during the treatment using concentrated ammonium hydroxide solution. The amount of removed Na was 53 ppm.

EXAMPLES 13–15

150 g samples of the carriers were used in Ag catalyst preparation that followed the exact details of the procedure in example 1. After calcination the catalysts were tested at a high work rate (330 Kg $EO/m^3/hr.$) to determine their relative stabilities. Table 3 summarizes the result of the test and compares it with the results of a carrier that was not pre-treated:

TABLE 5

| Example # | Carrier | Sel at 200 hr | Sel at 250 hr | Sel at 300 hr | Sel at 350 hr | Sel at 400 hr | Sel at 450 hr |
|-----------|---------|---------------|---------------|---------------|---------------|---------------|---------------|
| 1C | Untreated | 80.7 | 80.5 | 80.1 | 79.8 | 79.5 | 79.4 |
| 13 | 6 | 80.5 | 80.3 | 80.2 | 80 | 79.8 | 79.7 |
| 14 | 5 | 79.6 | 79.8 | 79.8 | 79.8 | 79.8 | 79.8 |
| 15 | 3 | 80.2 | 80.3 | 80.4 | 80.4 | 80.4 | 80.4 |

It is evident that the highest stability was a result of carrier washing at the higher pH.

EXAMPLES 16–17

150 g samples of washed carriers B and C were used in Ag catalyst preparation and the catalysts were tested at a high work rate (330 Kg $EO/m^3/hr.$) to determine their relative stabilities, similar to example 16. Table 4 summarizes the result of the test

TABLE 6

| Example # | Carrier | Sel at 200 hr | Sel at 250 hr | Sel at 300 hr | Sel at 350 hr | Sel at 400 hr | Sel at 450 hr |
|-----------|---------|---------------|---------------|---------------|---------------|---------------|---------------|
| 16 | 9 | 80.2 | 80.3 | 80.2 | 80.3 | 80.3 | 80.4 |
| 17 | 10 | 79.6 | 79.8 | 79.7 | 79.8 | 79.9 | 79.8 |

From the above it can be seen that catalysts prepared using the supports treated according to the invention have a high degree of stability and effectiveness for production of ethylene oxide.

I claim:

1. In a process for the preparation of a catalyst for the production of ethylene oxide comprised of silver supported on an alumina carrier, the improvement which comprises contacting the alumina carrier with an aqueous basic solution at a temperature lower than 100° C. and maintaining the pH of the basic solution above 8 during the contacting by the addition of a base.

2. The process of claim 1 wherein the pH is maintained above 9.

3. The process of claim 1 wherein the pH is maintained in the range of 10–13.0.

4. The process of claim 1 wherein a base is added to the aqueous basic solution during the carrier contacting.

\* \* \* \* \*